United States Patent [19]

Steele

[11] 4,170,844

[45] Oct. 16, 1979

[54] HYDROPONIC GARDENING METHOD AND SYSTEM

[75] Inventor: Richard S. Steele, Broomfield, Colo.

[73] Assignee: John E. Reilly, Denver, Colo.

[21] Appl. No.: 863,173

[22] Filed: Dec. 22, 1977

Related U.S. Application Data

[63] Continuation of Ser. No. 651,463, Jan. 22, 1976, abandoned.

[51] Int. Cl.$^2$ .................... A01G 9/16; A01G 9/14
[52] U.S. Cl. .................................. 47/62; 47/27;
47/29; 47/39; 47/58
[58] Field of Search ............... 47/62, 59, 39, 17, 79,
47/58, 29, 27

[56] References Cited

U.S. PATENT DOCUMENTS

| | | | |
|---|---|---|---|
| D. 237,898 | 12/1975 | Austin | 47/62 |
| 1,508,028 | 9/1924 | Robinson | 47/79 X |
| 2,060,735 | 11/1936 | Krueger | 47/62 |
| 2,485,914 | 10/1949 | Owens | 47/17 X |
| 2,649,102 | 8/1953 | McDonough | 47/29 X |
| 2,747,331 | 5/1956 | Steiner | 47/62 |
| 2,782,562 | 2/1957 | Watkins | 47/79 |
| 2,820,468 | 1/1958 | Park et al. | 47/29 X |
| 2,855,725 | 10/1958 | Carothers | 47/62 |
| 2,880,549 | 4/1959 | Knipe | 47/62 |
| 2,917,867 | 12/1959 | Bailey | 47/62 |
| 3,131,064 | 4/1964 | Malchair | 47/62 |
| 3,300,895 | 1/1967 | Dosedla et al. | 47/81 |
| 3,314,192 | 4/1967 | Park | 47/62 X |
| 3,323,253 | 6/1967 | Robins | 47/62 |
| 3,352,057 | 11/1967 | Ferrand | 47/62 |
| 3,453,786 | 7/1969 | Rebarchek | 47/17 X |
| 3,664,063 | 5/1972 | Ware | 47/39 |
| 3,673,733 | 7/1972 | Allen | 47/58 |
| 3,812,616 | 5/1974 | Koziol | 47/17 |
| 3,841,023 | 10/1974 | Carlyon, Jr. | 47/79 |

FOREIGN PATENT DOCUMENTS

| | | | |
|---|---|---|---|
| 473279 | 10/1937 | United Kingdom | 47/1.4 |
| 826101 | 12/1959 | United Kingdom | 47/17 |
| 1329249 | 9/1973 | United Kingdom | 47/17 |
| 1374647 | 11/1974 | United Kingdom | 47/17 |
| 214926 | 3/1968 | U.S.S.R. | 47/62 |

OTHER PUBLICATIONS

"Lighting for Plant Growth," Bickford, Kent State University Press, 12/73, pp. 204–205.

*Primary Examiner*—E. H. Eickholt
*Attorney, Agent, or Firm*—Reilly and Young

[57] ABSTRACT

A gardening method and unit utilizes a unique liquid circulating system in combination with an adjustable, high intensity lighting system including a novel form of reflector panel assembly in which the feeding cycle and the lighting cycle can be closely regulated to control the environment for plant life within an enclosed area. The method and system of the present invention is particularly advantageous in relatively compact portable units so constructed that the seedlings or plants may be grown in upper and lower spaced trays, each having its own lighting system controlled by a common timer and a common liquid circulating system in which the liquid or nutrient solution may be pumped into the upper tray and drained by gravity into the lower tray to carry out combined top flooding and subirrigation. In the alternative the system is operative to carry out top-irrigation by spraying water in the form of a fine mist over natural or organic soils. The circulation system is such as to minimize power requirements and reservoir capacity for a given rate of feeding for each tray.

15 Claims, 4 Drawing Figures

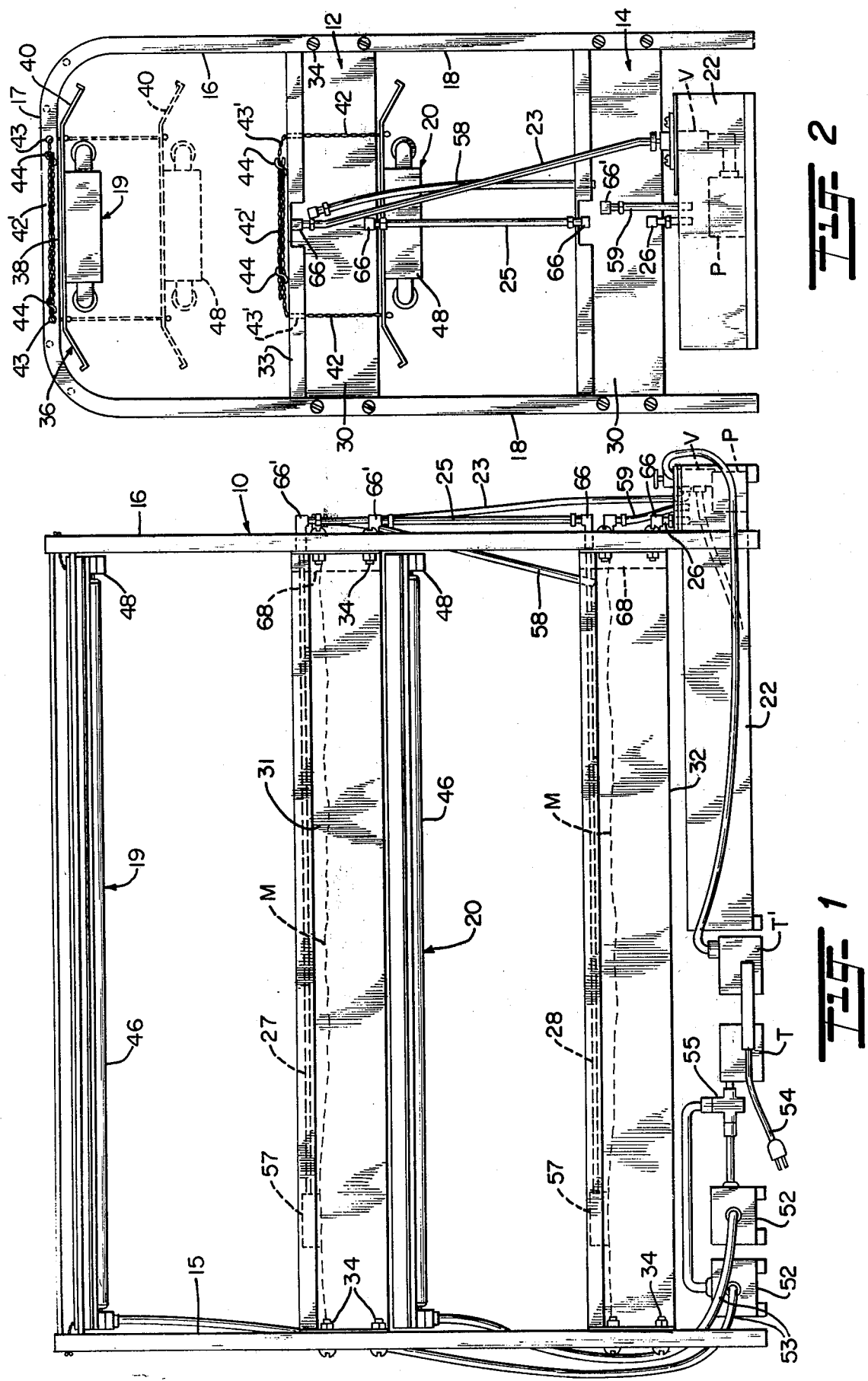

HYDROPONIC GARDENING METHOD AND SYSTEM

This application is a continuation of Ser. No. 651,463, filed on Jan. 22, 1976 and now abandoned.

BACKGROUND OF THE INVENTION

This invention relates to hydroponics and more particularly relates to a novel and improved method and system for growing plants within a limited space under controlled feeding, irrigation and lighting conditions comparable to those found on a commercial scale.

Hydroponic gardening relates to the growth of plant cultures in inert soils where the necessary nutrients and water are supplied from storage tanks and recirculated as needed for proper feeding. Generally, in the past, successful hydroponic gardening systems have been largely confined to operations carried out on a commercial scale because of the close control required over feeding, temperature and lighting cycles. Another difficulty in attempting to carry out hydroponic gardening on a smaller scale, particularly for the hobbyist, has been the requirement for a relatively large water supply with closely controlled pumping and circulation over predetermined time intervals. For instance, while water must be made freely available to the root system it must be closely controlled in such a way that the root system is not unduly stressed either by the presence of too much water which will cut off the oxygen and kill the root system or by permitting the growth media to dry out over extended time periods. In practice however it is extremely difficult to supply a constant ratio and concentration of essential nutrient elements without expensive analytical equipment and control since these vary a great deal with the type of plant as well as the light, water, temperature and other factors. Accordingly, successful gardening requires not only close control over the circulation of water and nutrient solutions to the growth media but also predetermined intensity and distribution of the lighting for predetermined time periods over the growing surface.

The smaller portable hydroponic garden units now commercially available are largely confined to sub-irrigation systems in which the solution is merely circulated into the growth media and permitted to completely fill the tray containing the growth media followed by draining of the solution usually through the same line employed for supplying or pumping the solution into the growth media. For example, a representative system of this type is disclosed in U.S. Pat. to Robins No. 3,323,253. Other systems employ separate delivery and drain lines but typically are so constructed and arranged as to require that the plant tray be flooded to capacity then allowed to drain. Still other more elaborate systems designed for commercial use employ a filter and pump on the return side for returning the solution from the plant tray to a reservoir or tank. Sub-irrigation systems per se suffer not only from the requirement for large amounts of water but also from the lack of proper aeration of the growth media. If the growth media is irrigated simply by filling the plant tray at period time intervals, then as the water slowly drains out of the tray after filling, the density in packing of the growth media is such that it becomes very difficult for the oxygen to fill or re-enter the pockets or voids created by removal of the water beneath the upper surface of the growth media.

Top irrigation systems have also been employed primarily on a large commercial scale for irrigation of natural soil in which the plants are watered usually by a spray or mist solution above the surface of the growth media. Typically in top irrigating systems the nutrient solution is not recirculated and the water and chemicals are wasted. However, its advantage resides in that it affords better natural aeration of the growth media, there is not as much danger of spreading disease and the costly recirculation systems are avoided. Again extremely close control is required during each watering cycle to insure that the soil is not unduly saturated; and to the best of my knowledge a top irrigation system has not been devised which can be used interchangeably with a sub-irrigating system in a self contained, portable gardening system for the home.

Lighting systems presently available for hydroponic gardening have been vastly improved over the years so as to provide high intensity lighting at the proper wattage to simulate outdoor growth of various plants under natural light. However, systems commercially available for lighting have been extremely expensive and in most it has been very difficult to assure uniform even light distribution with a limited lighting cycle in an inexpensive manner which would make it feasible for use by the hobbyist.

SUMMARY OF THE INVENTION

It is therefore an object of the present invention to provide for a novel and improved method and system for growing plants within a limited space or area under closely-controlled conditions simulating optimum conditions of growth.

It is another object of the present invention to provide for a hydroponic gardening method and system which is highly versatile, economical and easy to install, maintain, and operate under closely-controlled conditions.

It is a further object of the present invention to provide for a gardening method and system which permits utilization of different irrigation techniques for the same or different growth media, and requires a relatively low capacity solution supply for irrigation with minimal pumping and power requirements.

A further object of the present invention is to provide for a novel and improved gardening method and system in which a wide spectrum, high intensity lighting system can be employed with a minimum of heat, is lightweight and readily adjustable according to plant or foliage size and is capable of providing uniform distribution of light over a relatively wide area.

It is an additional object of the present invention to provide for a gardening method and system which is capable of carrying out combined top flooding and sub-irrigation in one or more vertically spaced levels of growth media in an extremely efficient manner; and further which permits use of a top spray system for closely controlled irrigation over limited timing cycles.

In accordance with the present invention, a gardening method and system has been devised in which a closed irrigation system is employed in combination with a vertically adjustable, wide spectrum high intensity lighting system which are closely coordinated and regulated to provide optimum conditions of growth for plant life. In the basic unit assembly of the present invention, seedlings or plants may be grown in upper or lower spaced trays, each tray being furnished with its own adjustable lighting system which is controlled by a common timer, and a closed irrigation or solution circulating system is provided in which a relatively small source of solution supply is required for pumping by a low capacity pump into the upper tray and the solution drained by gravity from the upper tray into the lower tray in performing combined top flooding and sub-irrigation in each tray. Overflow lines are provided for each tray along with a lower return or drain line from the lower tray back into the reservoir, the rate of drainage being regulated with respect to the rate of pumping in order to assure that sufficient solution is returned to the reservoir during the pumping cycle to prevent it from running dry.

A unique form of high intensity wide spectrum lighting system has been devised in which a low profile panel reflector assembly is adjustably mounted above each tray, the panel reflector assembly being sized to uniformly distribute light over the entire growth area while being extremely compact and lightweight so as to permit ready adjustment and prevent undesirable generation of heat. At the same time the panel reflector assembly for each tray is so constructed and arranged that it can be adjusted into closely spaced relation to the growth media in order to generate the necessary heat for germination of seedlings then raised to a level in accordance with plant or foliage size so as to provide optimum lighting with a minimum of heat. As an aid to reduction in size and weight of the lighting assembly, in the use of wide spectrum fluorescent lamps, the ballasts for the lamps are isolated from the lighting assembly.

Still another feature of the present invention resides in the use of a cover which can be removably disposed over the unit assembly, the cover being of extremely simple design and construction which will permit ready access to the plants as well as controlled ventilation and temperature so as to provide together with the irrigation system and lighting assembly optimum environmental conditions for the growth of plants of many types and sizes.

The above and other objects, advantages and features of the present invention will become more readily appreciated and understood from the following description of a preferred embodiment thereof when taken together with the accompanying drawings, in which:

BRIEF DESCRIPTION OF THE DRAWINGS

FIG. 1 is a front view in elevation of the preferred form of garden unit in accordance with the present invention.

FIG. 2 is an end view of the preferred form of invention.

DETAILED DESCRIPTION OF THE PREFERRED EMBODIMENT

Figure 3:
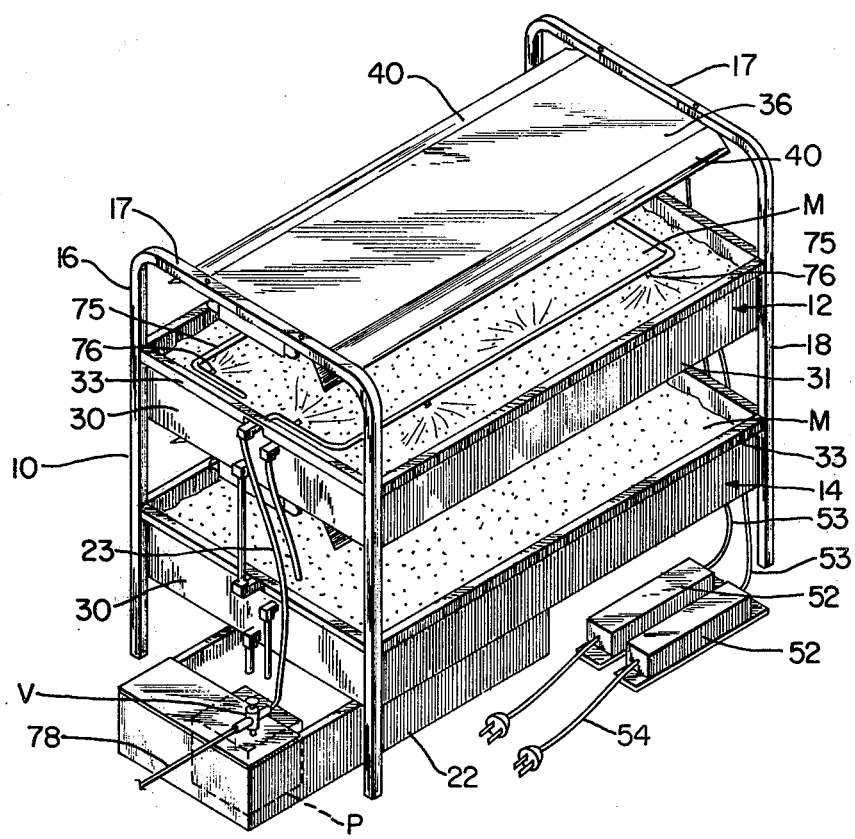
FIG. 3 is a perspective view of a modified form of garden unit in accordance with the present invention.

Referring to the drawings, a multi-tiered, hydroponic garden assembly 10 is broadly comprised of vertically spaced upper and lower trays 12 and 14 affixed to and suspended between tubular end frames 15 and 16. Each end frame 15 and 16 is of inverted U-shaped configuration and each consists of an upper horizontal end frame portion 17 and downwardly extending legs 18 at each corner of the assembly. Upper and lower high intensity lighting systems 19 and 20 also are adjustably mounted for extension between the end frames 15 and 16 in spaced relation above each respective upper and lower tray 12 and 14.

A liquid supply and circulating system is made up of an open reservoir or tank 22 disposed beneath the lower tray 14, and a feed line 23 extends from a submersible pump P in the reservoir through a three-way selector valve V to communicate with the end of the upper tray 12. A return line 25 extends from the bottom of the upper tray 12 to serve as a feed line into the upper end of the lower tray 14, and another drain or return line 26 extends from the bottom of the lower tray 14 back to the reservoir 22. The feed line 23 and the upper return line 25 each communicates with a delivery or irrigation line 27 and 28, respectively, which extend centrally across the upper end of each upper and lower tray 12 and 14, respectively, in a manner described hereinafter in more detail.

Each of the trays 12 and 14 correspondingly is of rectangular configuration being open at the top and having opposite end walls 30, sidewalls 31 and a bottom wall 32 which is sloped downwardly both toward the longitudinal axis and toward the return lines 25 and 26. An upper peripheral flange 33 extends along the upper edges of the end walls 30 and sidewalls 31 as shown. The upper and lower trays are attached to the legs 18 by suitable fasteners 34 which extend through the legs 18 into the end walls 30 of the trays, the trays preferably being attached to the legs 18 so that the trays are suspended in equally spaced relation between floor level and the upper extremities of the end frames 15 and 16 with sufficient slope along the bottom wall of each tray to permit drainage.

The high intensity lighting assemblies 19 and 20 are each defined by a low-profile panel reflector assembly 36 made up of a center or main elongated horizontal rectangular panel 38 with downwardly and outwardly inclined side panel reflector portions 40. The panel reflector assembly is of a length coextensive with the length of each tray and of a width just less than the width of a tray with each inclined panel reflector portion 40 preferably disposed at an angle on the order of 30° to horizontal. The upper reflector assembly 36 has its center panel 38 suspended from the upper horizontal ends of the end frame 15 and 16 by height adjustment means in the form of chains 42, there being a pair of chains 42 at each end which have upper ends extending through openings 43 in horizontally spaced relation to one another at each end 17, and the lower end of each chain 42 is attached at each corner of the panel 38 to set the light assembly at the desired level. Similarly, the lower reflector assembly 36 is suspended from the underside of the upper tray 12 by a lower set of chains 42 extending downwardly through openings 43' in the flanges 33 at opposite ends of the upper tray 12 and adjustably secured at the desired length for suspension of the lower panel 38 in predetermined spaced relation above the lower tray. The pairs of chains 42 at each end are adjustably fastened at the desired length by extending the excess chain lengths 42' horizontally toward one another and interconnecting together with an S-shaped hook 44; or if there is insufficient length for the chains to overlap one another, the S-shaped hooks may merely be fastened to each chain above the openings 43 or 43'.

Fluorescent lamps 46 are secured to and extend horizontally from opposite sides of a common mounting bracket 48 which extends the length of the center panel 38 of each reflector assembly 36, there being a pair of fluorescent lamps 46 spaced apart the substantial width of the center panel so that the light is reflected uniformly in a downward and inward direction by the center panel 38 and angled side reflector panel portions 40. In order to materially reduce the weight of the panel reflector assembly and provide the maximum light intensity of a given size of panel reflector, the ballast 52 for each of the fluorescent lamp fixtures in the upper and lower trays is isolated from the lamp by electrical wiring 53 so that the ballast can be located at a remote point from the assembly. As shown, the ballasts are positioned on the floor, and an electrical power cord 54 extends from timers T and T' into an outlet tree 55 from the ballasts 52, one timer T controlling the lighting cycle and the other timer T' controlling the pump cycle.

In order to provide the necessary irrigation and supply of nutrients to each of the upper and lower trays, most desirably the bottom reservoir 22 is positioned on the floor surface beneath the lower tray and is of open rectangular configuration for the purpose of storage of the water or nutrient solution therein. The submersible pump P includes a suitable inlet or intake, not shown, and a discharge port is connected to an inlet line 70 into the valve V. The feed line 23 and return line 25 each extend into an elbow-shaped fitting 66 mounted in the upper edge of an end wall 30 on each tray, each fitting 66 projecting through an opening in a foam liner 68 covering the inner surface of each end wall. The irrigating lines 27 and 28 are preferably in the form of lightweight plastic tubular members and extend horizontally across the greater length of the upper surface of each tray from communication with the fittings 66, each terminating in a plastic foam filter block 57 which filters and diffuses the water or nutrient solution from the tank 22 and permits it to seep into the growth media represented at M in each tray. The return lines 25 and 26 serve as drains from the lower ends of the trays 12 and 14, respectively, the upper return line 25 extending into the lower tray 14, and the lower return line 26 running back into the reservoir 22. In addition, overflow lines 58 and 59 are provided for each tray, the upper overflow line 58 extending from the upper edge of the end wall 30 into the lower tray 14, and the lower overflow line 59 extending from the upper edge of the lower tray into the reservoir 22. Preferably the outlet from each tray into its overflow line 58 or 59 extends from an elbow fitting 66' disposed beneath the point of introduction of solution into the irrigation line 27 or 28, and communicates with the interior of the tray slightly beneath the surface of the media M.

For the purpose of illustration and not limitation, each tray 12 and 14 may be on the order of two feet in width by four feet in length and a depth of six inches. The overall height of the assembly is on the order of fifty inches, there being a clearance space of approximately one foot between the upper surface of each tray and its respective lighting system 19 or 20. The adjustable suspension of the panel reflectors permits the lighting system to be spaced at the proper level above the surface of the media and plants to promote most efficient plant growth. This is of particular importance in the growth of plants from seedlings since the heat of the lighting system may be employed for initial germination and then be progressively raised as the plants grow.

In the lighting system itself, various types of lamp fixtures may be employed depending upon the types of plants to be grown, and the relatively wide spacing of the fluorescent lighting particularly in combination with the inclined low profile reflective panels has been found to greatly improve the light intensity for a given candle power as well as to direct the light over a much broader area than heretofore possible. This is in part attributable to isolation of the ballast from the lighting fixture and panel reflector assemblies, not only to permit a low profile reflector but to reduce its weight and permit ease of height adjustment.

Another advantage realized in the hydroponic garden assembly as described is the ability to use one or more trays in combination. For example, in starting a garden, only the upper or lower tray need be used in combination with a single upper lighting system, and the return line and overflow line for the one tray may extend directly back to the reservoir. Later, as required, an additional tray together with a second lighting system may be added with the additional return and overflow lines to complete the circulating system. In order to install additional trays, longer end frames 15 and 16 are used in order to afford the required spacing between the respective trays and lighting systems at each level. However, the following description of the method and operation carried out in the hydroponic gardening system according to the present invention is described in connection with the utilization of two trays 12 and 14 as shown.

In use, the hydroponic gardening assembly is a self-contained indoor garden with closed circulation system and adjustable lighting system which furnishes the ideal environment and all the necessary conditions for plant growth and development of all kinds including light, air, temperature, humidity, mineral salts or other food nutrients and the necessary base or support for roots. In the system of the present invention, the versatility is further demonstrated in that it permits a combination of top flooding so as to soak the growth media by capillary absorption as well as by sub-irrigation. Specifically, top flooding is carried out by pumping of the water or nutrient solution through the feed lines into the irrigation lines 27 and 28 and diffusing through the filter block 57 into the growth media deposited in each of the trays 12 and 14. Preferably, the growth media is made up of a combination of a thin bottom layer of a relatively lightweight aggregate, such as Perlite having a density on the order of twelve pounds per cubic foot, and an upper relatively thick and heavy layer of aggregate, such as, Idealite which has a density on the order of fifty pounds per cubic foot. As the solution is diffused through the upper layer it will by gravity and capillary absorption gradually soak laterally through the layer of the growth media. The Idealite material retains the water more by surface tension, as opposed to absorption, and serves to anchor the Perlite material so as to prevent it from floating it to the top. In this relation, under continuous pumping the tray will become completely filled with the solution so as to sub-irrigate the media.

Any possibility of overflow is avoided by the overflow lines 58 and 59, although the pumping system is so constructed in cooperation with the drain preferably with the timer T' for the pumping system so as to discontinue the pumping once a predetermined level has been reached in the trays. In this relation, for the size and depth of tray referred to earlier, it is possible to have a relatively short feeding cycle on the order of one hour with enough solution being drained back in relation to the amount pumped so that there will be sufficient solution in the tank to keep it from running dry. For example, employing a pump having a capacity of ninety gallons per hour for pumping nutrient solution into the upper tray, up to a four and a half foot head, can be done with a relatively small reservoir capacity on the order of nineteen to twenty gallons to provide sufficient irrigation for sixteen square feet of growing surface, i.e., the combined growing surface of the upper and lower trays 12 and 14. This is made possible by gradually draining the upper tray as it is being filled and removed into the lower tray 14 which will also continuously drain the solution back into the reservoir. Once sufficient solution has been pumped into the upper tray to assure filling of both the upper and lower trays and which may be done in a period of one to two hours, the pump is shut off and all solution from the trays is drained back into the reservoir. Of course the growth media will retain the necessary amount of moisture and food to nourish the plants by regulating the rate of drainage in relation to the pump capacity.

In using a combination of light and heavy growth media as described, it is often desirable to precharge the growth media by filling both trays with plain water. After the precharging cycle is completed the reservoir is then refilled with water and the nutrient food added and dissolved into the water for the first feeding cycle. Successive feeding cycles will require or consume much less solution but still have even distribution of the solution through the growth media during each feeding cycle as a result of the combined top flooding and sub-irrigation technique.

Another essential and a highly important element in hydroponic gardening is the lighting system employed. While it is conventional to employ high intensity lighting for hydroponic gardening it has been found in accordance with the present invention that the efficiency of the lighting system is greatly enhanced by the spacing of the high intensity lights both with respect to one another and above the level of the growth media and plants. Of course different types of plants require different amounts of light intensity or foot candle power. However the reflector size and angle of reflection along with the lamp spacing is critical for even distribution of the light over the growing surface. Typical light intensity as required for various plants is set forth in Table I below:

TABLE I

| Wide Spectrum Growth Lamps | Foot Candle Range Intensity | Typical Plants |
| --- | --- | --- |
| Sylvania Model "052" 110 Watt Tubes | 600-1000 | African Violets, Gloxina, Geranium, Coleus, Carnations, Vegetables |
| Model "051" 60 Watt Tubes | 350-700 | African Violets, Hibiscus, Prayer Plants, Wandering Jew, Wax Plant, Boston Fern |
| Model "050" 40 Watt Tubes | 320-400 | Philodendron, Ivy, Baby Tears |

In the preferred form, the lamp fixtures for the fluorescent lighting are spaced twelve inches between centers and the reflector panels have an overall size of twenty-three inches in width by forty-eight inches long so as to be comparable in area to the area of the growing tray. This is made possible in part by removal of the ballast from the lamps so as to greatly reduce the weight of the reflector panels and reduce the heat and temperature of the environment. Removal of the ballasts also permits adjustable mounting of the reflector panels so that their spacing above the trays can easily be adjusted by the chain suspension means 42. As a result, the timing cycles for the lights can be minimized while assuring more than ample lighting for the necessary growing cycle required for different plants as set out for the purpose of illustration in the above Table I.

Increased versatility is afforded in the present system by provision for overhead sprinkler lines in each of the upper and lower trays. As shown in FIG. 3, a sprinkler line 75 circumscribes the upper periphery of the tray 12 having nozzles 76 located at spaced intervals. The sprinkler line is connected to the fitting 66 in place of the irrigation line 27. In the form illustrated in FIG. 3, the jets or nozzles 76 are positioned in each corner of the tray so as to direct the spray inwardly over the top of the growth media in overlapping relation to one another. Although not shown, in a corresponding manner, another sprinkler line can be positioned in the lower tray 14. As an alternative to the use of peripheral spray distribution, a single sprinkler line may extend centrally across and above the tray with nozzles at spaced intervals therealong to spray outwardly over the growth media.

Typically, top spraying is carried out over a shorter timing cycle so as to prevent filling of the media and undesirable saturation of the root system. Further top spraying is used in irrigation of natural soils to permit spot watering of the soil and foliage at regular intervals. In either form, manual watering of the plants is made possible by connection of a watering hose 78 to one outlet of the valve V, the hose 78 being of a length to reach either tray and permit spot watering without a sub-irrigation cycle. The hose may be used also to change or empty the mixture in the tank 22.

Figure 4:
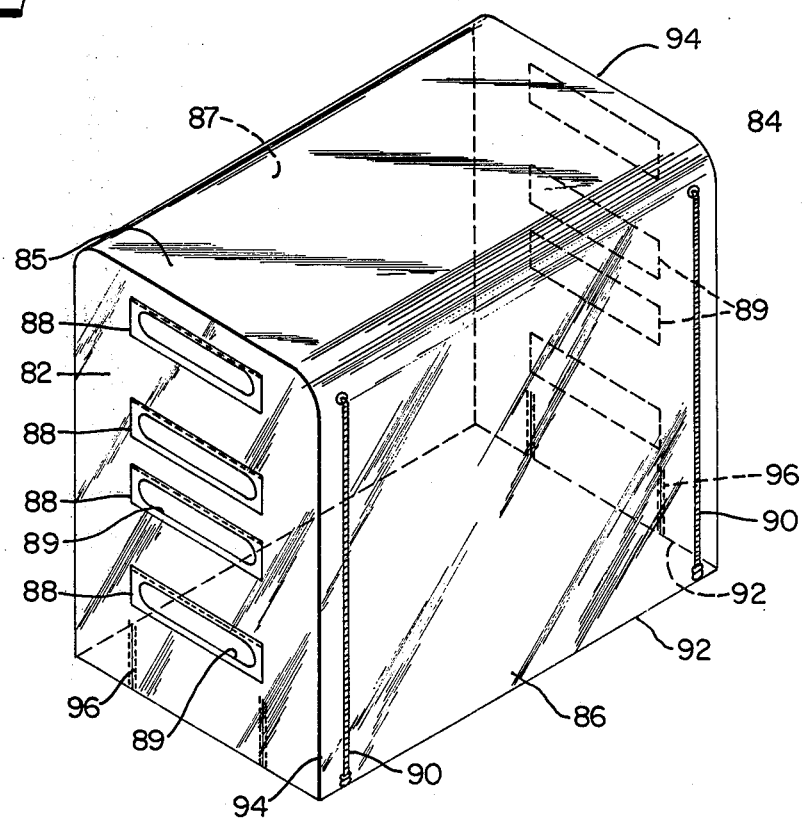
FIG. 4 is a perspective view of a preferred form of cover for removable disposition over the garden unit of the present invention.

As shown in FIG. 4, a plastic cover 80 which corresponds in size to the assembled unit can be dropped over the end frame so as to fully enclose the entire assembly in order to more clearly control environmental conditions in the garden. To this end, the cover 80 is preferably composed of a relatively thick gauge clear plastic material having end walls 82 and 84 corresponding to the size and configuration of the end frames 15 and 16 with an upper horizontal section 85 and front and rear vertical wall sections 86 and 87 all interconnected into a unitary cover. End flaps 88 cover oblong air vents 89 at vertically spaced intervals along each end wall 82 and 84. In order to permit access to the interior of the assembly vertical zipper sections 90 extend along opposite ends of the front wall section 86; also suitable reinforcing in the form of beading 92 extends along the lower edges and seams of the cover as shown. Vertical slits 96 are formed in the lower portions of the end walls 82 and 84 with reinforced stitching along each slit so as to provide a clearance opening for ease of placement and removal of the tank 22 from either end. When the tank is in position beneath the unit, the slit section forms a cover for the exposed contents of the tank.

Generally, in outdoor gardening, the plant roots are aerated or supplied with oxygen by cultivation or tilling the soil near the roots. This cultivation also breaks up the soil to enable the soil to hold moisture in feeding the plant roots. However in the system described, aeration is automatic as the water level rises in the trays to force out any stale oxygen; and thereafter when the watering cycle is completed and the water drains out of the media, a vacuum is left which draws fresh oxygen into the media in order to feed the roots. Of course in using natural or organic soils or for pot gardening it is most desirable to mechanically cultivate as in outdoor gardening. The plant life may be fed automatically either by use of a nutrient solution in the reservoir 22; or in the alternative, manual feeding may be accomplished by spreading of commercial fertilizer on top of the soil and mixing into the soil or by pre-preparation of organic growth media, such as from a compost pile. Most plant life enjoys a fifty to sixty percent relative humidity which is a necessary environmental condition for optimum plant growth. While normally this is difficult to maintain inside the home, use of the cover 80 with ventilation flaps permits the necessary control of humidity which is generated by evaporation of the water and moisture from the surface of the growth media. The cover traps and holds the humidity under the cover and allows the plant leaves to absorb the important life-sustaining moisture. Maintenance of the optimum relative humidity at fifty to sixty percent also permits the plant life to endure higher temperatures and a wider range of variable temperatures without appreciable harm to the plant structure.

In order to protect the plants from disease and infestation, the drainage system as described serves to prevent overwatering which would otherwise promote dry rot, mildew and fungus. The cover also affords protection against sudden drafts and extreme changes in temperature as well as the entry of undesirable bacteria and insects; and still further permits the use of pesticides within the home since they can be merely sprayed beneath the cover without spreading to the rest of the house.

It will therefore be appreciated from the foregoing that a highly versatile and efficient gardening method and system has been devised in which optimum environmental conditions may be simulated for growing virtually any type of plant. Indeed, the close control afforded over the different variables necessary to produce optimum conditions is such as to surpass or exceed actual conditions in which various plants are grown while minimizing adverse effects of sudden weather temperature or moisture changes. It is to be understood that various modifications, changes and variations may be made without departing from the spirit and scope of the invention as set forth in the appended claims.

What is claimed is:

1. In a hydroponic garden unit having upper and lower receptacles, each receptacle containing a growth media for plants therein and a reservoir beneath said lower receptacle containing a supply of acqueous nutrient solution, the improvement comprising:

nutrient solution circulating means between said reservoir and said upper receptacle including a first delivery line extending upwardly from said reservoir and substantially horizontally along the upper surface of the growth media in said upper receptacle, and filter block means in said first delivery line and disposed on the upper surface of the growth media to filter and diffuse the nutrient solution through the upper surface of the growth media in said upper receptacle, nutrient solution circulating means including a second delivery line extending along the upper surface of the growth media in said lower receptacle, and filter block means in said second delivery line and disposed on the upper surface of the growth media for filtering and diffusing said nutrient solution into the growth media in the lower receptacle, and return line means including a first return line portion extending from the lower interior of said upper receptacle into communication with said second delivery line to deliver the nutrient solution along the upper surface of said lower receptacle, and said return line means including a second return line portion from the lower interior of said lower receptacle to said reservoir.

2. In a hydroponic garden unit according to claim 1, further including an overflow line communicating with the interiors of said receptacles for removal of nutrient solution from said receptacle to said reservoir.

3. In a hydroponic garden unit according to claim 1, including a high intensity light assembly spaced vertically above and over the growth media in said receptacles, and adjustment means for adjusting the height of said lighting assembly with respect to the growth media, said lighting assembly including fluorescent lamps and a common panel reflector above said lamps having downwardly sloping side members operative to reflect the light in a downward convergent direction toward the growth media.

4. In a hydroponic garden unit according to claim 3 said lighting assembly including horizontally spaced fluorescent light members extending the length of said growth media, and a ballast for said light members remote from said lighting assembly.

5. A hydroponic garden unit comprising in combination:

a frame, upper and lower spaced receptacles each having a sloped bottom wall surface and growth media for plants deposited in each receptacle, a reservoir for an acqueous solution, a closed circulating system including delivery means for feeding solution under pressure from said reservoir to said upper receptacle, said delivery means including delivery lines traversing the upper surfaces of the growth media in each receptacle for delivery of the solution into the growth media and filter diffuser means at the terminal ends of said delivery lines for diffusing the nutrient solution into the growth media, and first return line means communicating with the lower interior of said upper receptacle for gravity flow of the solution from said upper receptacle into said delivery line for said lower receptacle at a rate less than the flow of solution through said delivery line into said upper receptacle, and second return line means communicating with the lower interior of said lower receptacle for return flow of solution into the reservoir, the rate of solution flow into said lower receptacle being greater than the rate of return flow under gravity from said lower receptacle to the reservoir, and high intensity lighting means in spaced relation above each receptacle including suspension means for suspending each of said lighting means independently of one another in predetermined spaced relation above each respective receptacle.

6. A hydroponic garden unit in accordance with claim 5, said high intensity lighting means including a common panel reflector assembly having a centrally disposed horizontal panel section and downwardly sloping side panel sections along opposite sides of said horizontal panel sections, and fluorescent lamps horizontally spaced for extension lengthwise along and beneath said panel reflector assembly.

7. A hydroponic garden unit according to claim 6, said lighting means for said lower receptacle being adjustably suspended from said upper receptacle, said fluorescent lamps being mounted for extension along the opposite lengthwise sides of each said central panel section adjacent to the juncture of said downwardly sloping outer panel sections.

8. A hydroponic garden unit according to claim 7, said central panel sections being of a width greater than one-half the width of each of said receptacles and said downwardly sloping panel sections extending at an angle of approximately 30° to the horizontal.

9. A hydroponic garden unit according to claim 5, further including an outer transparent flexible cover open at its bottom removably disposed over said unit, said cover including a front access portion extending the greater length of said unit, and vent portions at spaced intervals in said cover.

10. A hydroponic garden unit according to claim 9, said cover conforming in size to said unit and being open at the bottom for placement over said unit, said front access portion defined by vertically extending releasable fasteners adjacent to opposite ends of said cover.

11. A hydroponic garden unit according to claim 5, said delivery means in each receptacle including a delivery line extending along the upper surface of the growth media and terminating in a filter block member which is operative to filter and diffuse the solution into the growth media.

12. A hydroponic garden unit according to claim 5, said delivery means including a spray delivery line extending around the periphery of said upper receptacle in spaced relation above the growth media, and spray nozzles at spaced intervals along said spray delivery line to discharge the solution in spray form onto said growth media.

13. A hydroponic garden unit according to claim 5, an outer transparent flexible cover of a size to be removably disposed on said unit, said cover being open at the bottom and having upright end walls of inverted generally U-shaped configuration, opposite vertical sidewalls and a top horizontal wall surface extending between said end walls, vent flaps removably covering said vent portions and a front access portion formed in one of said sidewalls defined by vertically extending removable fasteners along opposite ends of said one sidewall.

14. The method of hydroponic gardening in growth media for plants contained in upper and lower receptacles comprising the steps of: top flooding the growth media in each receptacle characterized by filtering and diffusing the nutrient solution at the point of discharge from a circulating line into the upper surface of the growth media of the upper receptacle whereby to saturate the growth media by capillary absorption and surface tension, and draining the nutrient solution from the growth media in the upper receptacle and delivering through a circulating line to the lower receptacle at a controlled rate of flow and filtering and diffusing the nutrient solution from the circulating line into the upper surface of the growth media of the lower receptacle.

15. The method of hydroponic gardening according to claim 14 further including the step of adjustably positioning high intensity lights above the growth media and periodically raising the lights above the growth media to maintain a predetermined distance between the lighting system and the plants.

* * * * *